United States Patent [19]
Smithgall

[11] Patent Number: 5,150,245
[45] Date of Patent: Sep. 22, 1992

[54] MULTIPROCESSOR COMPUTER WITH OPTICAL DATA SWITCH

[75] Inventor: William T. Smithgall, League City, Tex.

[73] Assignee: International Business Machines Corporation, Armonk, N.Y.

[21] Appl. No.: 424,360

[22] Filed: Oct. 18, 1989

[51] Int. Cl.⁵ .............................................. H04J 14/00
[52] U.S. Cl. ..................................... 359/117; 385/16; 395/800
[58] Field of Search ................... 370/1; 455/600, 607; 359/117, 128; 385/18, 17, 16; 395/200, 800

[56] References Cited

U.S. PATENT DOCUMENTS

| | | | |
|---|---|---|---|
| 4,074,142 | 2/1978 | Jackson | 250/551 |
| 4,358,858 | 11/1982 | Tamura et al. | 455/607 |
| 4,365,863 | 12/1982 | Broussaud | 370/1 |
| 4,437,190 | 3/1984 | Rozenwaig et al. | 455/607 |
| 4,641,376 | 2/1987 | Rozenwaig et al. | 455/607 |
| 4,811,210 | 3/1989 | McAulay | 370/1 |
| 4,927,230 | 5/1990 | Tokumitsu | 385/17 |
| 4,953,155 | 8/1990 | Tangonau et al. | 370/1 |

OTHER PUBLICATIONS

"Design sketches for optical crossbar switches intended for large-scale parallel processing applications" by Hartman, et al., *Optical Engineering*, Bellingham, Wash., Apr. 1989, vol. 28, No. 4.

*Primary Examiner*—Edward L. Coles, Sr.
*Assistant Examiner*—Kinfe-Michael Negash
*Attorney, Agent, or Firm*—Jesse L. Abzug; Lauren C. Bruzzone

[57] ABSTRACT

An optical data switch for use within a multiprocessing environment is disclosed. Each processor has associated with it a data projector, such as a laser or an array of light emitting diodes, and a reading device, such as a Charge Coupled Device array. An optically reflective screen, or mirror, is arranged so that all processors can project their data on the screen at a specified location. Each processor's reading device has a view of the entire screen, thereby being capable of reading data from any other processor.

10 Claims, 4 Drawing Sheets

MULTIPROCESSOR COMPUTER WITH OPTICAL DATA SWITCH

BACKGROUND OF THE INVENTION

1. Field of the Invention

This invention relates to a method and apparatus for facilitating the interchange of data among processors in a multiprocessing environment. In particular, an optical data switch which permits each processor to talk with all other processors is disclosed.

2. Background Information

A multiprocessor computer is one in which the calculating task is divided up among several, sometimes many similar processor elements. The processors are often logically arranged in a geometric pattern such as, for example, the squares on a checkerboard. The difficulty of making electrical connections among processors, especially when the number of them is large, has forced a compromise which allows a processor to communicate directly with only its geometrically adjacent neighbors.

This approach solves the interconnection problem, but forces some severe constraints on the applications software which is to run in this environment. The software must not only lend itself to being broken up into modules that can execute in parallel, but also these modules must interrelate in such a way that any external data that they require must be available from an adjacent processor. Thus, the geometry of the computer weighs heavily on the final form of the software. If the applications software must deviate from the ideal form dictated by the computer geometry, the advantages of using multiple processors are quickly lost to cumbersome data transfers between non-adjacent processors.

Therefore, it is the object of this invention to provide an optical data switch which allows any processor in a multiprocessing environment to read data from any other processor.

It is another object of this invention to provide an optical data switch which allows any processor in a multiprocessing environment to post its resulting data at a location where it can be read by any other processor.

It is a further object of this invention to provide a method for exchanging data among processors in a multiprocessing environment.

SUMMARY OF THE INVENTION

These objects, and other advantages to be described, are realized by an optical data switch associated with the multiprocessing environment. Each processor has associated with it a data projector, such as a laser or array of light emitting diodes (LED's), and a light sensitive reading device, such as a Charge Coupled Device (CCD) array. An optically reflective screen, or mirror, is arranged so that all processors can project their data on the screen at a specified location. Each processor's reading device has a view of the entire screen, thereby being capable of reading data from any other processor.

BRIEF DESCRIPTION OF THE DRAWING

These features, advantages, and objects will be more fully understood with reference to the description of the preferred embodiment and the drawings in wherein.

DESCRIPTION OF THE PREFERRED EMBODIMENT

While the optical data switch to be described is associated with computer processors, the design and function of the processors themselves is beyond the scope of this invention. Therefore, it would be apparent to one skilled in the art that any of the currently available and well-known processor technology can be utilized in connection with the optical data switch herein disclosed. Also, for ease of understanding, the invention is described for use with a 9 processor array, each processor transmitting 16 bits of information at a time. Of course, the actual implementation can be extended to any number of processors transmitting any number of bits of data.

Figure 1:
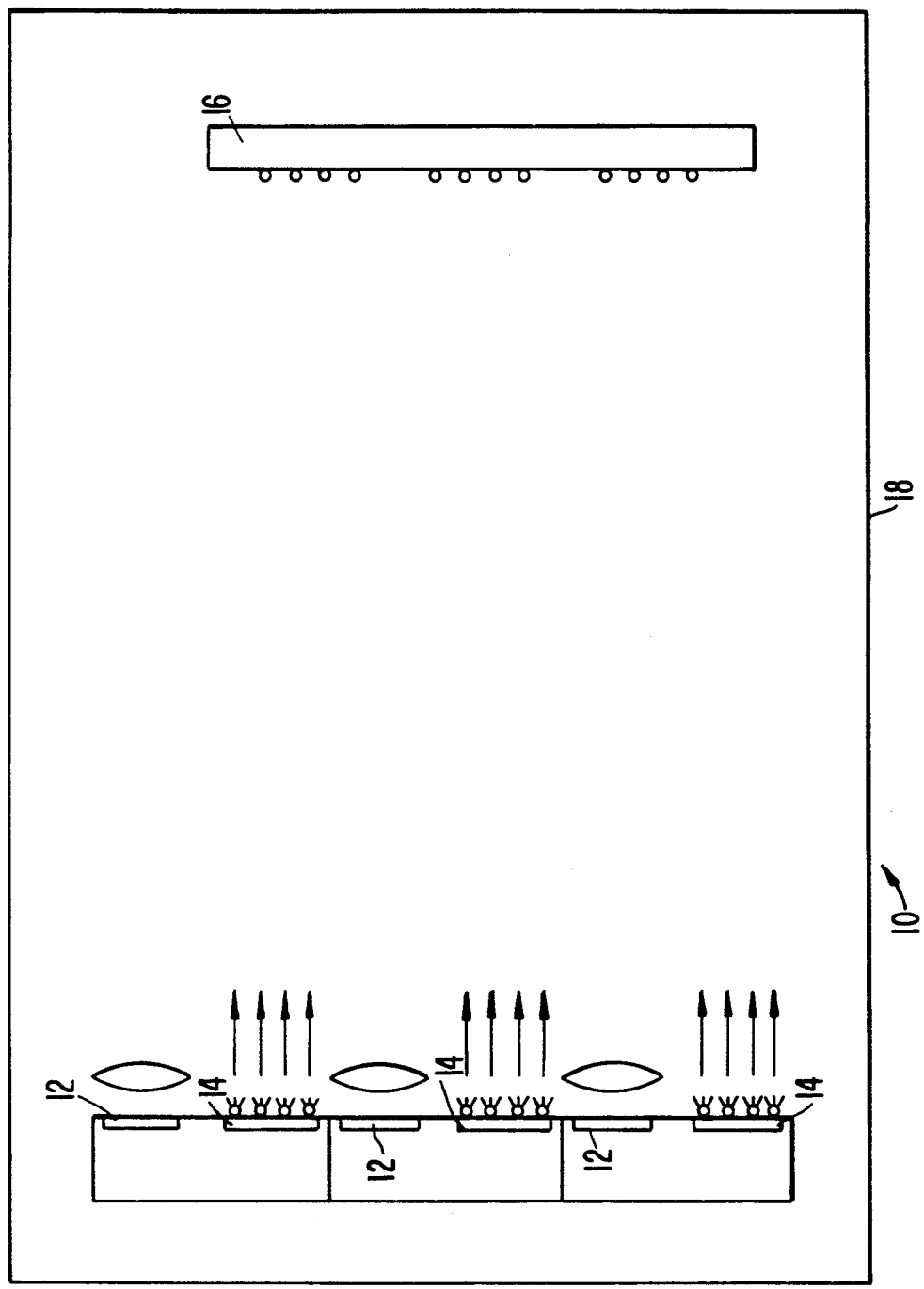
FIG. 1 is a side view of the optical data switch showing the reader/projector arrays in relation to the reflective screen.

Referring to FIG. 1, the optical data switch 10 consists of three primary components, a data reading device 12 associated with each individual processor 11, a data projector 14 associated with each individual processor 11, and an optically reflective screen 16, such as a mirror. All of these components are housed in a light-proof enclosure 18. Each of these components will be described in greater detail.

Data Projector

Figure 2:
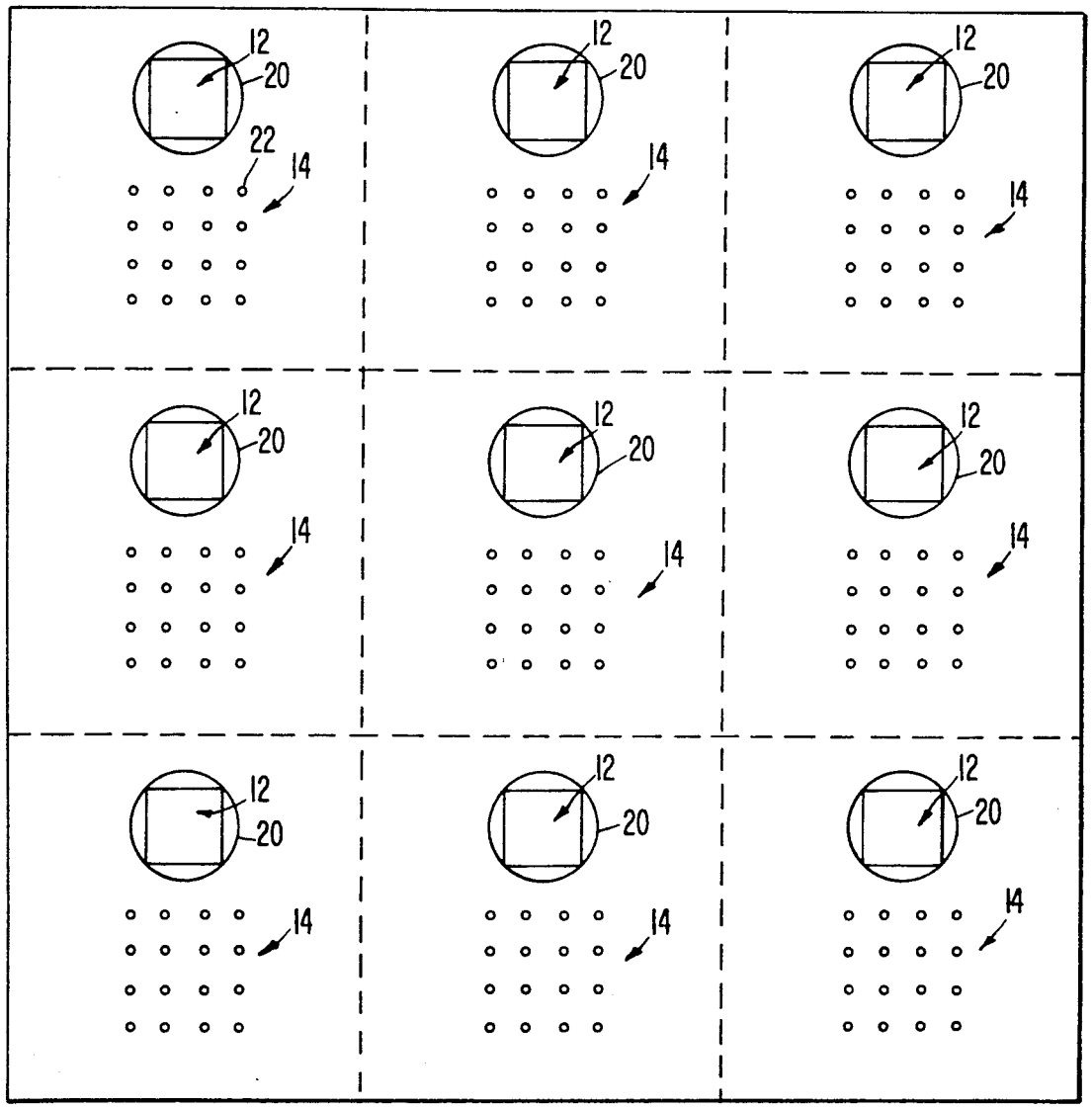
FIG. 2 shows a plane view of a 3×3 reader/projector array.

FIG. 2 shows a 3×3 array of data reading devices 12 and data projectors 14 for a 9 processor 11 computer system. Each processor has associated with it a data reading device 12, with focusing lens 20 and a data projecting device 14. Data projecting device 14 is illustrated for a 4×4 or 16 bit arrangement, but it would be evident to one skilled in the art that projecting device 14 can include any number of optically active devices for any number of desired bits.

Each projector 14 consists of optically active devices, devices that emit visible radiation and whose light output can be focused into a tight beam for projection against a reflective screen. The aiming and focusing of the light beams are critical, since a processor's data must be at the correct place on the screen so that the other processors can find it when needed. In the preferred embodiment, the projecting elements 22 are very small LED's. Their primary requirement is that they be bright enough and have an angle of dispersion that allows their images in the reflecting screen to be visible and resolvable from the vantage point of all other processors in the system. Alternatively, solid-state lasers could be used. Each processor has its own array of projecting elements 22.

Data Reading Device

Each processor also has a data reading device 12 associated with it that is capable of viewing the reflective screen 16 (FIG. 1) and all the data projected therein. The data reading device 12 must be capable of converting light into an electrical signal and it must have sufficient resolution to discriminate between different regions 30 of the reflective screen and different dot patterns within a region 30 (FIG. 4).

Figure 3:
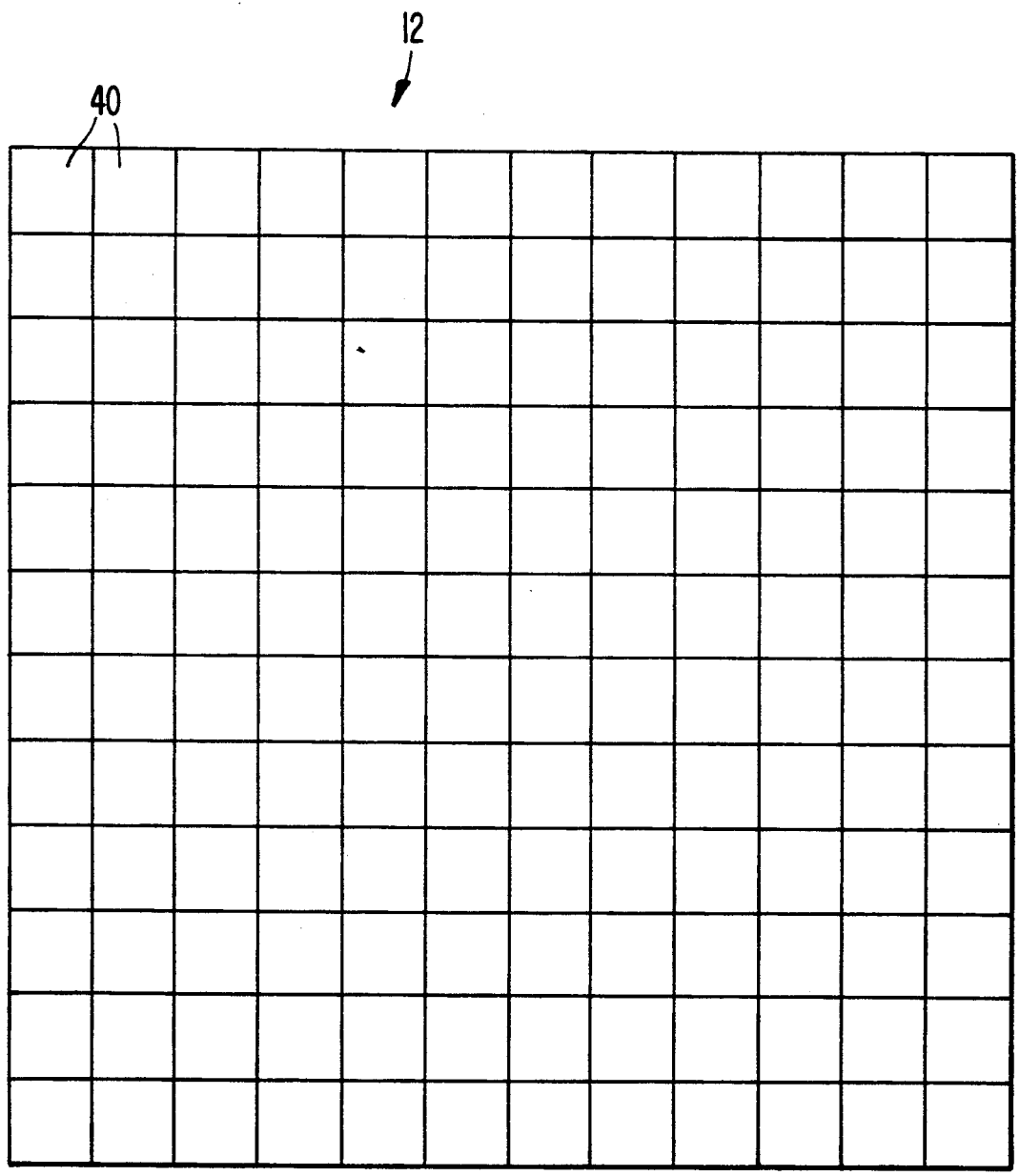
FIG. 3 shows a plane view a 12×12 CCD array.

Referring to FIG. 3, one data reading device 12 is shown. For this example, the data reading device 12 is a Charge Coupled Device (CCD) having 144 elements 40 in a 12×12 array. There is a 1 to 1 correspondence of elements 40 to data projecting elements 22 (FIG. 2). The CCD 12 is an array of optically sensitive cells 40 which convert light to electrical signals. It is designed to resolve between many different light levels, but the application only requires the ability to distinguish between "on" and "off". Referring back to FIG. 2, each data reading device 12 sits behind a lens 20 which focuses the reflected light from the screen onto the device 12.

Reflective Screen

Figure 4:
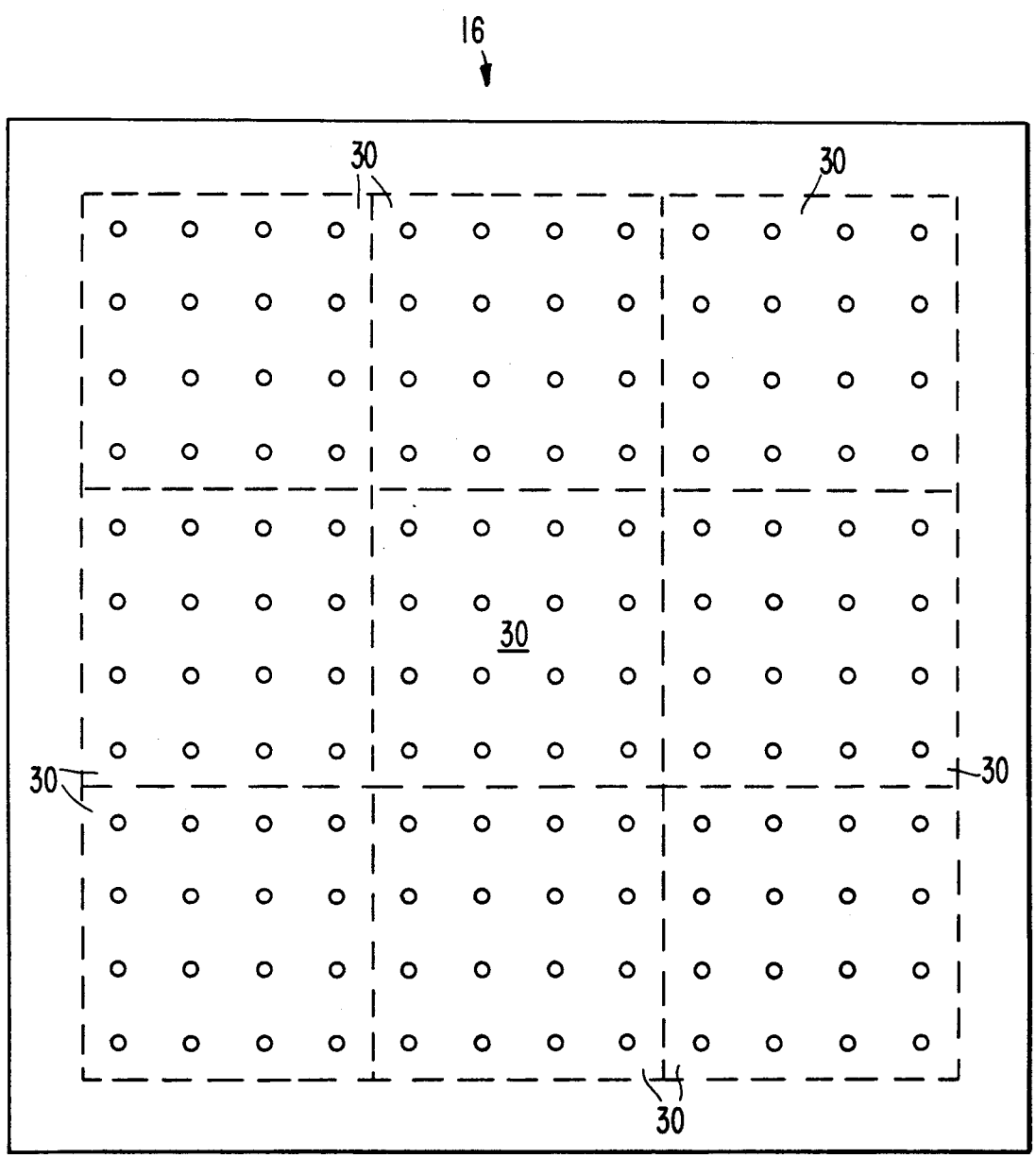
FIG. 4 shows a plane view of a reflective screen for a 3×3 projector array.

The reflective screen 16 is shown on FIG. 4. Its requirements are that it be flat, rigid enough to resist distortion due to vibration and temperature changes, ánd optically uniform. Many suitable materials are currently available: glass, ceramic or metal with a proper surface preparation or coating. In the preferred embodiment, the reflective screen 16 is a glass mirror.

Reflective screen 16 is divided up into 9 regions 30, each associated with a processor. Within each region 30, data from that processor is projected and reflected to all the data reading devices. In this manner, each processor is capable of reading data from all other processors.

Light-Proof Enclosure

To eliminate any undesired light from interfering with the transmission of data, a light-proof enclosure 10 is required, as shown in FIG. 1. Another requirement is that the reading devices, the data projectors, the screen, any associated optical devices must be held in rigid physical relationship to each other. A single enclosure could perform all of these tasks.

With the invention described herein, the concept of parallel computing has even greater potential. Since data transfer has been improved significantly, each processor has a much simpler task to perform and can therefore be a much simpler device. Future application can be extended to other information handling fields such as data switches for telephone systems, switches for electronic networks, etc.

While the invention has been described with reference to a preferred embodiment, it is apparent that the concept disclosed can be applied to other applications without departing from the spirit and scope of the invention. Accordingly, the invention should only be limited as provided in the following claims.

I claim:

1. A data switch for sharing data among a plurality of data processing members comprising:
   a plurality of data processing members;
   projecting means connected to each of said data processing members for projecting data generated by said data processing member;
   reading means connected to each of said data processing members for reading projected data; and
   reflecting means for reflecting the projected data to the means for reading data, said reflecting means, said projecting means and said reading means optically aligned with respect to each other such that each of said reading means is capable of reading projected data from each of the data processing members simultaneously.

2. The data switch as claimed in claim 1 wherein said plurality of data processing members are computer processors.

3. The data switch as claimed in claim 2 wherein said data projecting means comprises at least one laser.

4. The data switch as claimed in claim 2 wherein said data projecting means comprise a LED array.

5. The data switch as claimed in claim 2 wherein said means for reflecting the projected data is a reflective screen.

6. The data switch as claimed in claim 1 wherein said plurality of data processing members are voice or digital processors.

7. The data switch as claimed in claim 6 wherein said data projecting means comprise at least one laser.

8. The data switch as claimed in claim 6 wherein said data projecting means comprise a LED array.

9. The data switch as claimed in claim 6 wherein said means for reflecting the projected data is a reflective screen.

10. Apparatus for sharing data in a multiprocessor environment comprising:
    a plurality of processors connected together in a multiprocessing configuration;
    means connected to each of said processors for projecting data generated by each of said processor onto a reflective screen; and
    means connected to each of said processors for reading projected data from said reflective screen, all of said projecting means and said reading means optically aligned such that each of said reading means is capable of reading projected data from all of the data projecting means;
    whereby all of said processors can simultaneously have access to data generated by any one or more of the plurality of processors.

* * * * *